(12) United States Patent
Cohnstaedt et al.

(10) Patent No.: US 7,784,215 B2
(45) Date of Patent: Aug. 31, 2010

(54) METHODS AND COMPOSITIONS FOR IMPROVED LIGHT TRAPS

(76) Inventors: Lee William Cohnstaedt, 304 SW. 9th St., Corvallis, OR (US) 97333; Jonathan Isaiah Gillen, 304 SW. 9th St., Corvallis, OR (US) 97333; William Martin Cohnstaedt, 561 NW. Jackson St., Corvallis, OR (US) 97330

( * ) Notice: Subject to any disclaimer, the term of this patent is extended or adjusted under 35 U.S.C. 154(b) by 192 days.

(21) Appl. No.: 11/936,540

(22) Filed: Nov. 7, 2007

(65) Prior Publication Data

US 2009/0025275 A1    Jan. 29, 2009

Related U.S. Application Data

(60) Provisional application No. 60/585,266, filed on Nov. 9, 2006, provisional application No. 60/961,773, filed on Jul. 24, 2007.

(51) Int. Cl.
*A01M 1/22* (2006.01)
(52) U.S. Cl. ............................ 43/112; 43/113; 362/231
(58) Field of Classification Search ....................... None
See application file for complete search history.

(56) References Cited

U.S. PATENT DOCUMENTS

| | | | |
|---|---|---|---|
| 4,949,500 A * | 8/1990 | Jefferys | 43/98 |
| 5,949,636 A * | 9/1999 | Johnson et al. | 361/232 |
| 6,199,316 B1 | 3/2001 | Coventry | |
| 6,401,383 B1 * | 6/2002 | Meade et al. | 43/112 |
| 6,655,080 B2 * | 12/2003 | Spiro et al. | 43/139 |
| 6,662,489 B2 | 12/2003 | Spiro et al. | |
| 6,840,003 B2 | 1/2005 | Moore | |
| 6,965,205 B2 | 11/2005 | Piepgras et al. | |
| 7,073,287 B2 | 7/2006 | Lau | |
| 7,181,885 B2 | 2/2007 | Spiro et al. | |
| 7,191,560 B2 | 3/2007 | Harris | |
| 7,281,350 B2 | 10/2007 | Wilbanks | |
| 7,281,811 B2 * | 10/2007 | Thuot Rann et al. | 362/96 |
| 2002/0112394 A1 * | 8/2002 | Meade et al. | 43/112 |
| 2005/0195598 A1 * | 9/2005 | Dancs et al. | 362/231 |
| 2007/0056208 A1 | 3/2007 | Chen et al. | |
| 2007/0068068 A1 * | 3/2007 | Weiss et al. | 43/132.1 |

OTHER PUBLICATIONS

Briscoe, et al. The Evolution of Color Vision in Insects. Ann. Rev. Entomol. 46: 471-510 (2001).
Burkett et al, Field evaluation of colored light emitting diodes as attractants for woodland mosquitoes and other Diptera . . . J Am Mosquito Control Assoc 14(2):186-195, 1998.

* cited by examiner

*Primary Examiner*—Christopher P Ellis

(57) ABSTRACT

A process and device to attract a multitude of terrestrial and aerial arthropods using a plurality of light wavelengths emitted from light emitting diodes (LEDs). The selected light wavelengths increase trap capture rates by taking advantage of the insect's physiological and behavior instincts associated with vision and sensory perception. The LED wavelengths (light color) are selected to mimic the electromagnetic spectra of natural features, such as sugar and blood meal resources within the target insect's environment. Lighting platforms containing a plurality of LEDs produce the mimicking colors and can be optimally arranged in either a cylindrical fashion or on polygonal lighting chips. These two types of lighting platforms can be modified to fit existing insect traps, used in new light trap designs, or incorporated into insect traps currently lacking a lighting component.

26 Claims, 4 Drawing Sheets

METHODS AND COMPOSITIONS FOR IMPROVED LIGHT TRAPS

RELATED APPLICATIONS

This application relates to and claims priority to U.S. Provisional Patent Application No. 60/585,266, which was filed Nov. 9, 2006, and to U.S. Provisional Patent Application No. 60/961,773, which was filed Jul. 24, 2007. Both of which are commonly owned and incorporated herein by reference in their entireties.

FEDERALLY SPONSORED RESEARCH OR DEVELOPMENT

Not applicable.

FIELD OF THE INVENTION

The present invention relates to devices, kits, and methods for the capture of terrestrial and aerial arthropods based on their propensity to move towards a specific color or color combination. More specifically, this invention provides a replaceable and adjustable lighting system that allows for increased capture rates of targeted arthropods by mimicking their natural visual attractants. The lighting system also provides improved energy efficiency and enables capture traps to be adapted to various environments, conditions, and arthropods of interest.

BACKGROUND OF THE INVENTION

With the introduction of West Nile virus into the United States and the continuing presence of malaria, dengue, encephalitis viruses, and leishmania in much of the world, insect monitoring and control of vector-borne diseases is a critical healthcare need. Presently, there are approximately 550 State health departments and mosquito abatement districts throughout the United States that spend approximately 400 million dollars annually on mosquito control. Additionally, insects cause enormous agricultural damage worldwide either directly or indirectly through disease transmission.

Traps to attract insects are commonly used for surveillance and control of insect-vectored diseases or for public health research. Universal black light traps are used by the United States Department of Agriculture to monitor crop pests in fields and storage areas. Centers for Disease Control (CDC) light traps are used routinely to monitor insect populations and disease prevalence. The military uses light traps to monitor insects in and near troop encampments. In Iraq and Afghanistan, a large number of cases of leishmaniasis among U.S. troops has increased the need for effective surveillance of phlebotomine sand flies, the insect vector of leishmaniasis. Researchers interested in disease vectors (flies, mosquitoes, sand flies, and other insects and arthropods) also use light traps for collecting and monitoring.

In general, ultraviolet (UV) light traps attract more insects than similar white light traps, but power consumption is much greater for UV traps and is often a limiting factor. Further, the collection of non-target insects and arthropods in either type of trap can complicate results and analyses. Adequate public health surveillance is often impossible because of the high costs and logistical problems associated with using current CDC-traps or comparable light traps. Other limitations of known capture traps include an inability to readily adjust to different conditions or environments, irregularly shaped areas, and to target specific insects or arthropods.

A number of attempts to improve upon white light traps have used incandescent lights, fluorescent lights, or light emitting diodes (LEDs) alone or in combination, as attractants. Other insect traps use bait such as $CO_2$ or heat, either alone or in combination with each other or light. For example, U.S. Pat. No. 7,191,560 to Harris uses heat and light; U.S. Pat. No. 7,281,350 to Wilbanks uses a plurality of green LEDs; U.S. Pat. Nos. 7,181,885 and 6,662,489 to Spiro use blue light, preferably from at least one LED, in combination with heat, carbon dioxide, and moisture; U.S. Pat. No. 7,073,287 to Lau uses an LED emitting low intensity violet light; and U.S. Pat. No. 6,965,205 to Piepgras refers to the use of LEDs as an insect attractant and repellent.

U.S. Pat. No. 6,840,003 to Moore utilizes a combination of different forms of light from LED, ultraviolet, and fluorescent light sources and discloses that a plurality of light sources will effectuate greater trapping efficiency, but Moore teaches away from selectively using such light sources to target specific arthropods. In fact, the invention of Moore is specifically designed to attract and trap all types of insects in an area without specificity. Similar to Moore, U.S. Pat. No. 6,199,316 to Coventry utilizes a combination of ultraviolet and broad spectrum light with a light mixer, such as a prism, to produce a light attractive to a wide range of target insects. The spectrum light of Coventry is specially designed to provide a wide range of different wavelengths simultaneously.

Importantly, none of these examples provide for or teach a means of selective trapping that is crucial for reliable surveillance and pest control without damage to non-target, beneficial species.

U.S. Patent Appl. Pub. Nos. 2007/0068068 of Weiss and 2007/0056208 of Chen both teach light traps designed to specifically target mosquitoes by using a variety of light sources to produce wavelengths in the UV and visible spectra. Weiss also teaches that flickering or operating LEDs in sequence may be a useful attractant and that specific wavelengths of either the UV or visible spectrum may be used. While Weiss states that different species of mosquitoes are attracted to different wavelengths of light, Weiss does not identify those species or their respective attractant spectra. Further, neither Weiss nor any other known patent or application disclose or teach using light emitted from LEDs without a reflector or light mixer of some type. Using a reflector reduces the field of insect capture by creating blind spots behind the reflectors.

Presently, the art does not provide or teach traps that can be adjusted or programmed to selectively target a species or group of arthropods in one set of circumstances and then be adjusted to selectively target a different species or group of arthropods in another set of circumstances. It is desired that a means of easily adjusting existing non-selective traps to selectively trap targeted arthropods and simultaneously be less attractive to non-targeted arthropods be found. Further, it is desired that such methods and compositions be economical and sufficiently flexible to adjust to numerous different types of conditions. It is desired that a light trap be more energy efficient and selective under field conditions so that costs are lowered and monitoring, especially of disease-vectors or crop pests, is more sensitive and reliable.

SUMMARY OF THE INVENTION

The invention discloses compositions and methods for increasing the capture of targeted arthropods by using light systems that arrange one or more LEDs in fixed positions to emit light that mimics natural attractants or repellants. Advantageously, the lighting systems provided may be adjusted to alter the brightness, i.e. light intensity, the zone(s) of attraction, the wavelengths of light emitted, or a combination thereof of capture traps. In particular, the LEDs may be adjusted independently from one another such that different LEDs emit different wavelengths, light intensity, or combinations thereof.

In particular, the invention provides a lighting system for a capture trap that comprises at least one replaceable lighting platform and at least one supporting member. The lighting platform comprises an electrical circuit having a Zener diode, a resistor, and at least one light emitting diode (LED). The resistor regulates the voltage to the LED so that the intensity or brightness of the light emitted by the LED can be adjusted as desired. While Zener diodes are known in the electrical arts, Zener diodes are not known to be used in other light systems in traps. Herein, the Zener diode serves to protect the LEDs from reverse electrical current. A second resistor may optionally be located between a positive terminal of the electrical circuit and the Zener diode such that the second resistor regulates the current to the Zener diode to prevent prolonged reverse current from burning out the Zener diode.

The supporting member holds the LED(s) at a variable angle in a substantially rigid position. Holding the LED(s) at a fixed variable angle(s) provides several significant advantages. By allowing the light emitted from the LED(s) to be emitted directly from a trap without a reflector, light mixer, or similar structure, attractive wavelengths, especially UV and other higher energy wavelengths, are not absorbed and the attractiveness of a capture trap is increased without increasing power consumption. Further, holding the LED(s) at a variable angle allows the size and dimensions of the zone of attraction to be adjusted as needed. Using variable angle LED(s) also allows for the brightness or intensity of the light emitted to be adjusted to existing conditions (e.g. a comparatively well-lit trapping area due to moon or ambient light versus a relatively dark trapping area) so that the attractiveness is enhanced.

An exemplary preferred lighting system comprises one, two or more LEDs. The lighting system may comprise more LEDs, including 3, 4, 5, 6, 7, 8, 9, 10, 11, 12, 13, 14, 15, 20, 25, 30, 40, 50, 60, 75, 100, 125, 150, 175, 200, 250, 300, 350, 400, 450, 500 or more LEDs. The number of LEDs used will influence the amount of power required and the amount of time that the capture trap can be effectively used. In most preferred embodiments for small to mid-sized traps the lighting system comprises 1 to 12 LEDs. Large capture traps, such as encephalitis vector surveillance (EVS) or universal bucket traps, generally will require more LEDs (preferably about 10-25 LEDs) to provide an effective zone of attraction whereas broad area traps such as Shannon traps may require hundreds of LEDs to provide adequate illumination around the trap.

The invention preferably uses a plurality of LEDs to attract and trap insects and other arthropods. The LEDs are of separately adjustable color and intensity. LED lights are readily available in a variety of 5 nm wavelengths to produce a range of colors of light from ultraviolet to infrared that includes the visible light spectrum. Wavelengths emitted from LED bulbs range from about 250 nm to about 2000 nm. Further, a plurality of wavelengths may be used in combination by the invention. The specific combination(s) used will depend upon the species of arthropod(s) that is (are) to be attracted or repelled.

Supporting members may be either cylindrical or polygonal. One preferred polygonal supporting member is a polygonal circuit board, especially a printed circuit board (PCB) or embedded circuit board. An advantage of a polygonal circuit board is that one or more LEDs may be located on one or more sides of the polygonal circuit board. A preferred polygonal PCB has 2, 3, 4, 5, 6, 7, 8, 9, 10, 11, 12, 13, 14, 15, 20, 25, 30, 40, 50, 60, 75, 100, 125, 150, 175, 200, 250, 300, 350, 400, 450, 500 or more sides. More preferably, the PCB has 2 to 12 sides and at least one LED per side. In general, it is preferred that the sides of the polygon are about equal in length.

More than one lighting platform may be used in a lighting system. These lighting platforms may be in a number of configurations such that the intensity of emitted light and/or dimensions of the zone of attraction vary. A planar or linear configuration is preferred so that LEDs and electronics may be more easily optimally arranged and secured. For example, if the supporting member is cylindrical, lighting platforms may be attached throughout the entire length of the cylinder to form a wand. Alternatively, a plurality of lighting platforms with polygonal supporting members may be used to create a variety of three-dimensional shapes, including a wand. Lighting platforms must be sufficiently separated from one another to prevent a short circuit. The number of lighting platforms that may be effectively used will be limited by the power consumption and the length of the cylindrical supporting member. Where the supporting member is polygonal, in particular a circuit board, a standoff can be used to separate the lighting platforms. Those of skill in the art will recognize that the use of standoffs to separate circuit boards is well known in the art.

The invention also provides a method of using a lighting system. Specifically, the method comprises inserting one of the described lighting systems into a capture trap and adjusting the lighting system to emit the desired wavelength(s) of light to attract one or more species of targeted arthropod. The intensity, or brightness, or the light, type(s) of wavelength emitted, and variable angle at which the LED(s) is fixed may all be adjusted to attract the desired target(s) under given environment conditions. For example, one or more LEDs may be substituted to emit any wavelength between from about 250 nm to about 2000 nm. LEDs can be of variable color, intensity, and a plurality of LEDs can be used. The resulting method increases target insect capture and electrical energy efficiency while simultaneously decreasing non-target insect capture rates. The method may be used to modify existing insect light traps, new traps, or to improve current traps without a lighting component.

Kits for adjusting the attractiveness of a capture trap and methods of using such kits are also provided by the invention. These kits, and their methods of use, may be used to replace the lighting systems in existing traps, including those that used white or UV light. Replacing such systems will improve power consumption in many of the traps so that they may be used for longer periods of time without battery replacement. If desired, these broad spectrum traps may also be adapted to LEDs to be more selective so that targeted arthropods are more likely to be attracted, or repelled, and their zones of attraction may be altered to meet environmental conditions.

Kits comprise at least one replaceable lighting platform and at least one supporting member. Preferred kits will include a plurality of lighting platforms. The lighting platform has an electrical circuit comprising at least one light emitting diode (LED), a Zener diode, and a resistor to regulate the voltage (brightness) of the LED. The addition of the Zener diode, not found in other LED traps, allows for the exchange of the lighting units into non-LED traps while still protecting against human error. Optionally, the electrical circuit included in the kit may include a second resistor between the positive terminal of the electrical circuit and the Zener diode. This second resistor regulates the current to the Zener diode to prevent a burnout from continued overload. The supporting member holds the LED(s) at a variable angle(s) in a substantially rigid position, and it may be cylindrical or polygonal. If the supporting member is polygonal, a preferred supporting member is a circuit board, more preferably an embedded circuit board. One or more LEDs may be located on one or more sides of a polygonal circuit board including in the kit. Kits that include one or more circuit boards will also include a standoff.

Methods of adjusting the attractiveness of a capture trap comprise inserting an adjustable lighting system into a capture trap. The adjustable lighting system comprises at least one replaceable lighting platform and a supporting member. The lighting platform includes an electrical circuit comprising at least one light emitting diode (LED), a Zener diode, and a resistor that regulates the voltage to the LED. The supporting member holds the LED(s) at a variable angle(s) in a substantially rigid position so that the light emitted may be adjusted to the desired wavelength(s) and/or intensity of light and to a desired three-dimensional zone of attraction.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

A. Principles of Lighting Systems

Figure 1:
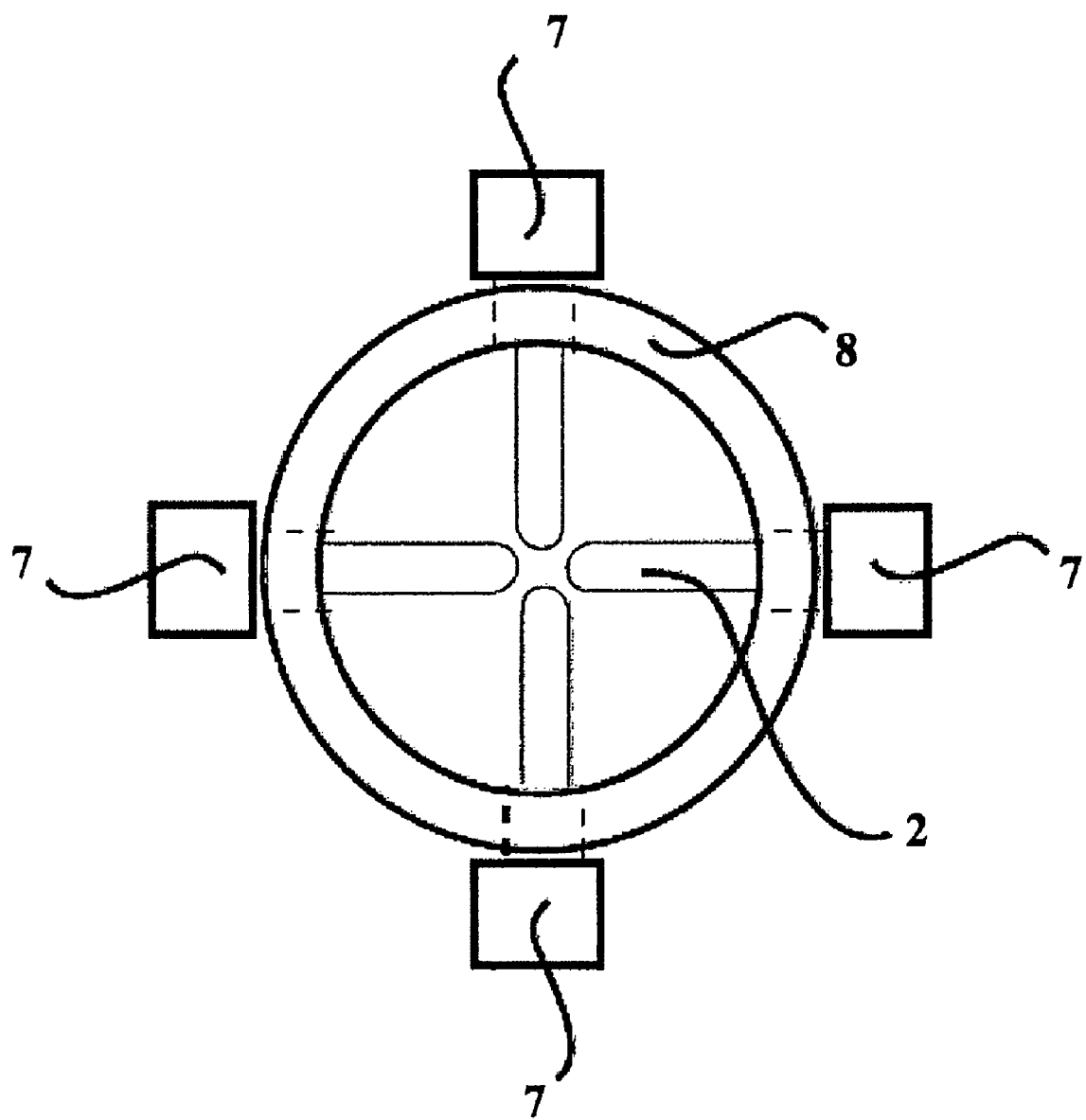
FIG. 1 is a cross sectional drawing from above of a lighting system where the supporting member is cylindrical.

The invention provides a lighting system and replacement lighting system that advantageously uses emitted light instead of reflected light, which is used in conventional LED light traps. An advantage of using emitted light is that fewer of the high energy wavelengths, like ultraviolet (UV), are absorbed by organic materials (e.g. dust and oil from skin contact) or inorganic materials as compared to systems that use a reflector to direct light in many directions. Thus, the invention allows more high energy wavelengths, such as UV, to be projected from a trap. No known traps use direct emittance because prior to the present invention, LED bulbs could not be correctly arranged to provide sufficient coverage without using excessive amounts of power or creating heavy bulky portable power units. The present invention overcomes these problems by using a novel fixed arrangement of bulbs to provide effective coverage while using relatively little power.

Conventional light traps with LEDs use one or more bulbs with light beamed at a reflector because the LEDs do not have broad viewing windows. Generally, these LEDs only had conical viewing angles of 15-30 degrees, which means that twelve bulbs are needed to make a circular beam of light with a width of 30 degrees. As a result, to achieve an effective zone of attraction, many more LEDs are required, and power consumption is relatively high. Consequently, conventional light traps that use LEDs usually include another type of attractant or source of light. Furthermore, reflectors reduce the capture field or zone of attraction by creating blind spots behind the reflectors, and reflectors tend to absorb UV light emitted from the LEDs; thus, further reducing the zone of attraction created by the LEDs and increasing the requirement for a supplemental light source.

In contrast, the lighting systems of the invention use "variable angle" LEDs to emit light. With LED technology, the greater the viewing angle of an individual LED bulb, the less distance the light is projected, which reduces the zone of attraction. In contrast, a narrow bulb angle yields greater projection of emitted light. Thus, a combination of variable angle LEDs will maximize the lighting area and zone of attraction for complete coverage for any given lighting unit. Conventional traps do not provide variable angled LEDs, and consequently, are less able to effectively maximize the lighting area and zone of attraction than the present invention.

Depending upon the specific arrangement of the LEDs in the lighting platform, the system can provide 360 degrees or more of coverage around a trap with variable angled LEDs. Desirably, the light zone projected from each LED overlap a little with the light zone(s) created by adjacent LEDs. If there is no overlap then the outer edges of the conical zone do not project as far. By overlapping the zones slightly, they will be brighter and thus project farther.

Lighting systems of the invention that incorporate a polygonal supporting member, for example a printed circuit board (PCB), advantageously emit light across the entire upper hemisphere rather than just in a downward conical radius with reflected light. This greater coverage with attractive light is important for trapping indoors, caves, or other covered areas as the hemispherical light emittance more than doubles the capture area of reflected light systems. Where this type of hemispherical-shaped coverage is desired, the polygonal shape is preferred for the supporting member.

Another advantage of the invention is that the size and shape of the attraction zone may be adjusted to meet certain conditions or target certain arthropods. For example, a trap may incorporate 8 variable angle LEDs, each of which has an effective 50 degree window to provide for 360 degree coverage in a uniform manner. (A small degree of overlap between LED ranges is desired to provide effective coverage.) Alternatively, the same trap may be adjusted so that 4 LEDs have an effective 90 degree window to, again, provide uniform 360 degree coverage. The remaining 4 LEDs may emit a different wavelength(s) of light or a narrower effective degree window. For example, the remaining 4 LEDs may have an effective 30 degree window so that they emit a brighter (higher intensity) light. This configuration allows light to be broadcast farther on the cardinal points, which would increase the field of collection along those points while maintaining the local area of capture. It also allows the number of traps needed to effectively capture arthropods in an irregularly shaped area to be reduced.

For example, a barn with 4 corridors arranged in an "X" shape would need a minimum of 2 conventional traps; however, using the invention, the same barn could be equipped with a single trap located at the center of the "X" and achieve the same results. Another example is the trapping area next to a tree or house. The invention allows the shape of the zone of attraction to be adjusted to minimize illumination of the tree or structure and maximize illumination of the open area. This ability to adjust the shape of the trapping zone improves energy efficiency, which in turn, reduces labor and costs associated with trap maintenance.

The invention also includes features to reduce the possibility of damage from reverse electrical current. Reverse electrical current is second only to battery failure as the leading cause for trap problems during field collections. Insect field collection traps commonly use 6 volt batteries or battery packs to provide power. Confusing the positive and negative terminal is a common occurrence when installing traps. The Zener diode protects the LEDs from this reverse current. Zener diodes are not used in fluorescent or incandescent light traps because fluorescent and incandescent light bulbs are not ruined by reverse current. Known LED traps do not incorporate a Zener diode because the traps are not modular, interchangeable, or adaptable; and therefore, the possibility of incorrectly inserting the positive and negative terminals is remote.

The user can control certain parameters that necessitate a plurality of lighting conditions of said device that are adjustable as desired. These parameters may include bulb replacement, that allows for insect genera specific platforms, particular trapping habitats, and different insect targets. Typical trapping habitats include caves, domestic structures, forests, and fields.

This invention encompasses systems and methods to maximize the capture of a plurality of arthropod species, preferably targeted species, by using light emitting diode (LED) technology to mimic the light frequency sensitivity(ies) of arthropod species and act as an energy efficient visual attractant to them. Advantageously, the invention provides for greater flexibility because the colors or wavelengths, viewing angles, and intensities of any or all of the LEDs may altered to suit different environments, conditions, and targeted arthropods.

The invention includes mimicking LEDs that have narrow light spectra and can be used to attract or repel insects based on the insects' innate responses to visual stimulants, including both attraction as positive phototaxis and repulsion as negative phototaxis. The energy efficient LED technology is used for monitoring, controlling, trapping, and studying arthropods and the diseases they transmit.

B. Components of Lighting Systems

The lighting systems of the invention comprise at least one replaceable lighting platform 1 and at least one supporting member 8. The lighting platform 1 includes an electrical circuit 2 that comprises a positive terminal 3, a Zener diode 4 that acts as a one-way gate to prevent the reverse polarity of the electrical circuit 2, a resistor 5, a negative terminal 6, and at least one light emitting diode (LED) 7. The supporting member 8 holds at least the LED 7 in a substantially rigid position. The resistor 5 regulates the voltage to the LED 7. See FIGS. 1-4.

It is expected that in most instances, a plurality of LEDs 7 will be desired so that sufficient brightness or combinations of wavelengths can be achieved to maximize attraction. Each LED 7 includes both a positive and negative terminal that complete the electrical circuit 2 when the LED(s) is attached to the lighting system. Those of skill in the art will recognize that a different number of LEDs may be used. For example, the number of LEDs may range from 1 to 500 or more. It is recognized that increasing the number of LEDs will increase power consumption. Preferred numbers of LEDs range from 1, 2, 3, 4, 5, 6, 7, 8, 9, 10, 11, 12, 13, 14, 15, 16, 17, 18, 19, to 20 per lighting platform. More preferably, the numbers of LEDs range from 1 to 12 per lighting platform. The number of lighting platforms per lighting system may be varied to meet particular needs and power consumption objectives.

Figure 2:
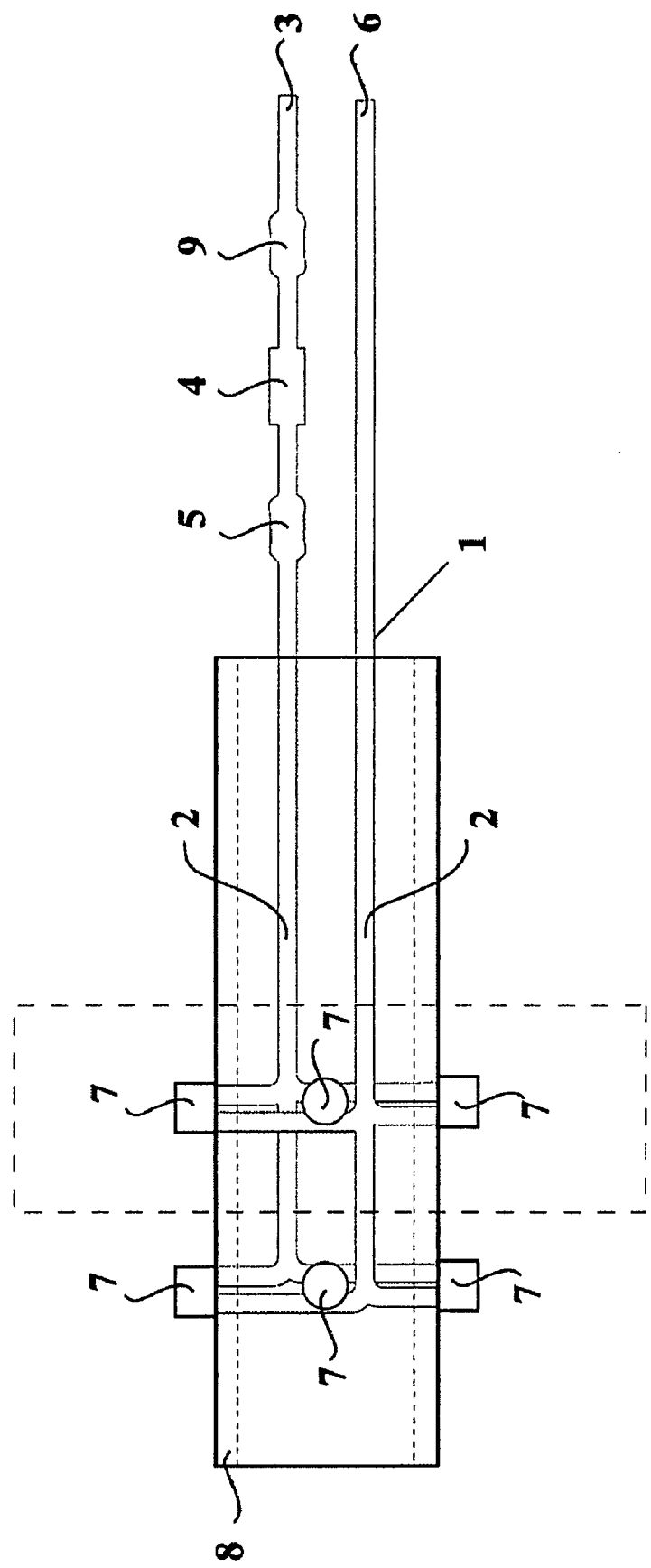
FIG. 2 is a planar view of a lighting system where the supporting member is cylindrical. The dashed box indicates optional additional lighting platforms.
Figure 4:
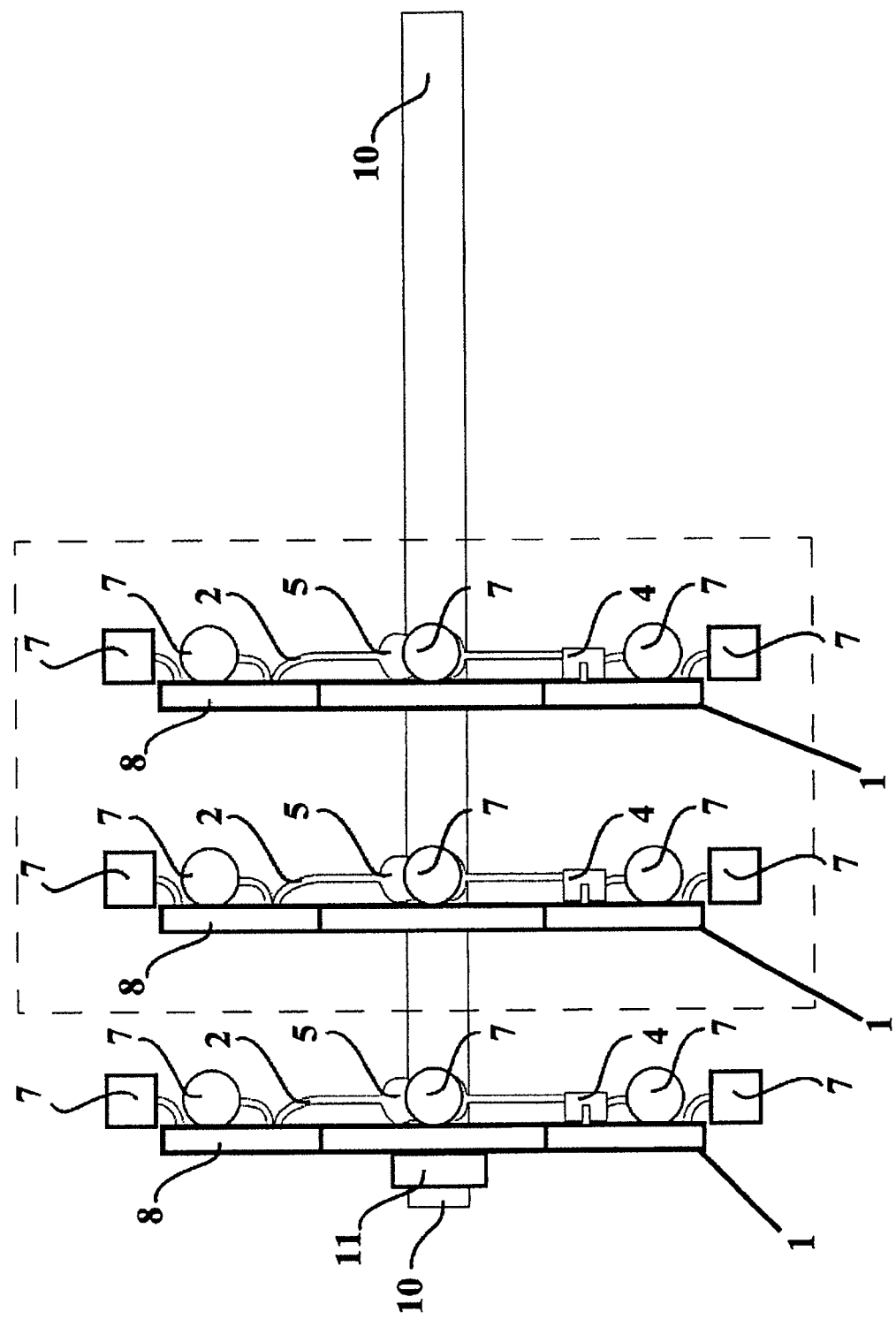
FIG. 4 is a planar view of a lighting system where the supporting member is an octagonal embedded circuit board and a standoff is used. The dashed box indicates optional additional lighting platforms.

An advantage of the lighting system is that a plurality of lighting platforms 1 may be used simultaneously (see FIGS. 2 and 4). A plurality of lighting platforms 1 provides for greater flexibility for the photo spectrum emitted. For example, multiple wavelengths of light and/or increased brightness for one or more of the desired wavelengths may be easily combined by using a plurality of lighting platforms 1. Thus, one or more arthropod species may be specifically targeted at a time. Further, the replaceable nature of the lighting system allows for the same capture trap to be used to capture one or more target species using one set of wavelengths and then later the same trap can be adjusted to capture a different target species or set of species using a completely different set of wavelength parameters. Additionally, the resistor 5 allows for the brightness to be adjusted to the trapping conditions (e.g. day, night, moon or no moon, etc.) by adjusting the voltage to the LED 7.

In some cases, it may be desired for the lighting system to include a second resistor 9 between the positive terminal 3 and the Zener diode 4 such that the second resistor 9 regulates the current to the Zener diode 4 to prevent the Zener diode 4 from prematurely burning out (see FIG. 2). In some cases, it may be desired for the lighting system to include a standoff 10 to attach the lighting system to a trap or to separate two or more lighting platforms 1 from each other to prevent an electrical short and/or to place the emitted light at a particular angle and/or direction (see FIG. 4). Where a standoff 10 is present it is generally attached to the lighting platform 1 by a bolt 11 or other suitable fastener.

Figure 3:
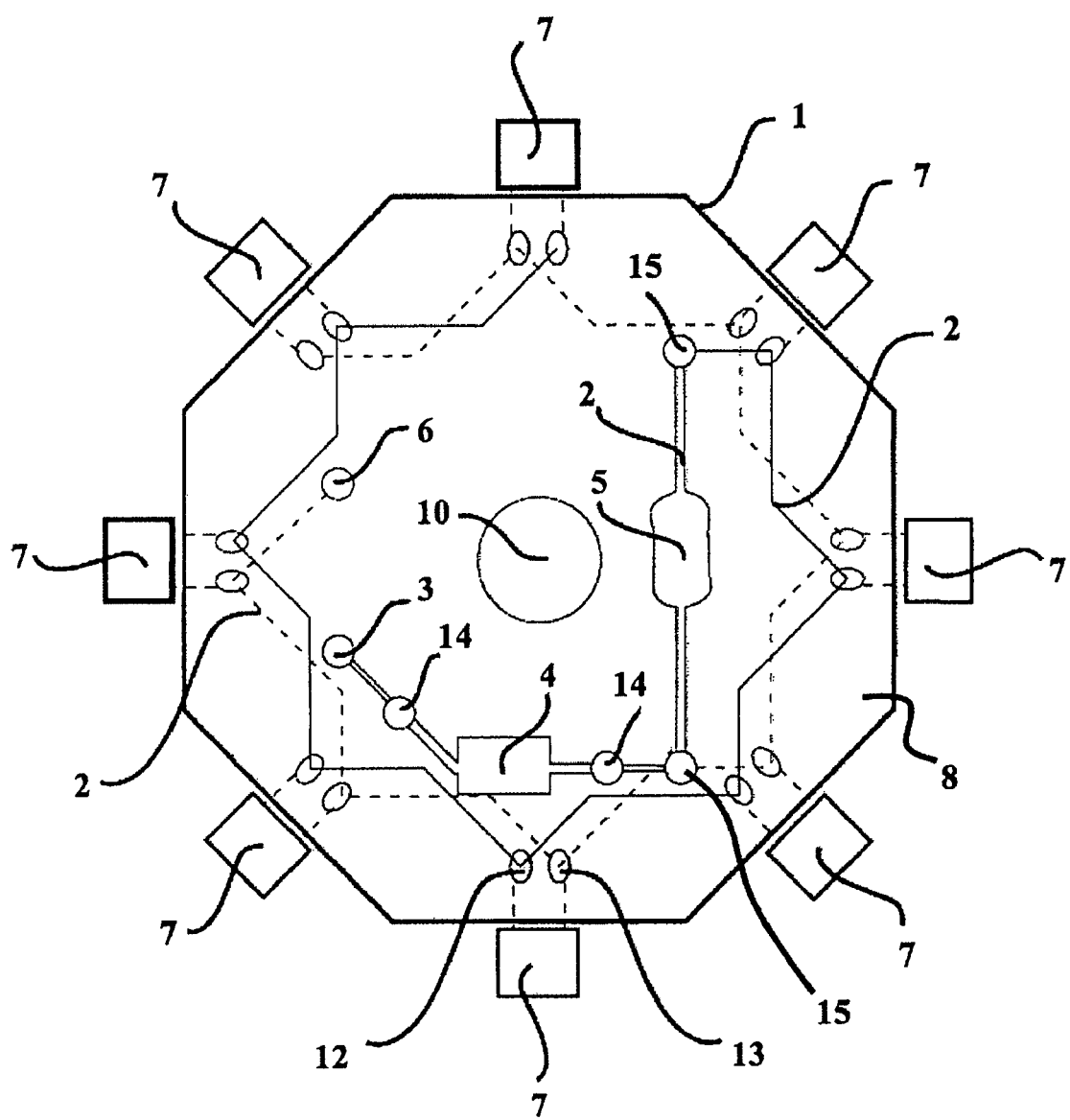
FIG. 3 is a cross sectional drawing from above of a lighting system where the supporting member is an octagonal embedded circuit board.

In one embodiment the supporting member 8 is cylindrical (see FIGS. 1 and 2). In another embodiment the supporting member 8 is polygonal, more preferably a polygonal circuit board, and most preferably a polygonal embedded circuit board (FIGS. 3 and 4). An advantage of the polygonal configuration is that at least one LED may be located per slot on one or more sides of the polygon, which provides greater flexibility for emitting multiple light wavelengths and/or levels of brightness. Regardless of its configuration, the supporting member 8 may be made from a variety of materials that include metal, plastic, fiberglass, any combination thereof, or any other suitable material known in the art.

A preferred configuration for the lighting platform is linear, or planar, so that LEDs and electronics can more easily be optimized and secured to the supporting member. A linear configuration also allows additional layers of LEDs to be added (see dashed box of FIG. 2). Many additional levels can be added to create the desired photo spectrum by simply adding more lighting platforms.

Where the supporting member 8 is a circuit board (FIGS. 3 and 4), electrical current is supplied to terminals 3 and 6 on each embedded circuit board 8 before moving to the embedded circuits 6 and 7, which allow electrical current to flow around the circuit board to the resistor 5, Zener diode 4 and LEDs 2. The resistor 5 controls the brightness of each lighting platform located on a polygonal circuit board 8 by independently regulating the voltage. The resistor 5 and Zener diode 4 are soldered to the circuit board using mounting holes 14 and 15, respectively. The LEDs 7 are soldered to mounting holes 12 and 13. Additional LEDs 7 can be added by adding additional sides to the polygon or by adding more layers of polygons (see dashed box in FIG. 4).

A preferred device of this invention has an octagonal printed circuit board containing LEDs on each side to position the LEDs in an evenly arranged horizontal display. Multiple polygonal circuit boards allow for additional lighting platforms and for greater intensity of light to be emitted from a trap.

In FIGS. 1-4 each lighting platform can have a plurality of sides, each holding a plurality of LEDs 7. Each LED 7 is independent of the other LEDs in the lighting platform and can be substituted for any viewing angle or wavelength of LED, including ultraviolet and infrared, which are invisible to human eyes.

C. Using Lighting Systems

The new lighting systems provided by the invention use ultraviolet (UV) light emitting diodes (LEDs) to increase battery life, reduce by-catch, increase trap attractiveness to con-specifics, and improve modularity (i.e. smaller and lighter batteries may be used for portable units as compared to conventional technology). Initial tests indicate that the new lighting systems will last about twelve times longer than comparable UV traps presently on the market. The trap catch composition for traps using the invention is comparable to other UV traps and is about twice as much as for incandescent light traps.

Further, the modularity of the new lighting systems allow for adjustments to color (wavelength) and LED numbers in each unit including the ability to easily convert between UV and normal light for different trapping conditions. Current traps are essentially restricted to using about 372 nm fluorescent UV light or incandescent white light of fixed intensity or brightness. In contrast, the new lighting systems can independently use any wavelength (color), combination of wavelengths (colors), brightness (intensity), or combinations thereof for each lighting unit.

The new lighting systems and replacement lighting systems based light traps are important contributions to global health because they can efficiently collect disease-vector surveillance information on major diseases in developing countries and provide a more efficient means of capturing other target arthropods. For example, initial prototypes of the disclosed lighting systems were used for surveillance of sand flies in French Guiana. During a three month period, the traps using the disclosed lighting systems captured over 400 sand flies, which was over 10-fold more than comparable conventional traps.

A direct comparison of traps is shown below in Table 1. Ultraviolet light was initially used because insects have a highly conserved UV eye pigment (rhodopsin) sensitive to around 360 nm. This visual pigment is 16 times more sensitive to photons of light than the other visual pigments. The fluorescent UV light traps collected about 1.5× as many flies as the traps using the disclosed system (LED UV replacement bulb), but the traps using the new system lasted more than 5× as long and weighed 5× less. Traps using replacement lighting systems were more effective, lasted longer, and weighed less than the incandescent white light traps.

TABLE 1

Comparison of three types of trap lighting systems

| Light Source | Avg. # of flies/night[1] | Current (in milliamps)[2] | Batteries needed | Energy used per week | Weight per week per trap |
|---|---|---|---|---|---|
| Incandescent white light bulb | 21.5 | 240 A (~4 trap nights) | 4 D-cells (17.2 Amp-hr) | 8 batteries | 3.2 lbs. |
| Fluorescent UV light bulb[3] | 42 | 610 A (~1.5 trap nights) | special (20.0 Amp-hr) | 4 recharges | 8 lbs. |
| LED UV replacement bulb | 28.25 | 90 A (~8 trap nights) | 4 D-cells (17.2 Amp-hr) | 4 batteries | 1.6 lbs. |

[1]Four consecutive nights of trapping during the rainy season. The means are compared with non-parametric statistics (rank ordered) because environmental variation is not normally distributed.
[2]The typical power arrangement for CDC light traps is a battery pack of four D-cell batteries. The trap nights are the average amount of time a trap continues to function on a battery pack as calculated from field testing. Each set of 4 batteries weighs 1.6 lbs.
[3]Does not include the power needed to initiate the fluorescent tube illumination.

Field research requiring insect traps especially in developing countries is severely limited by the cost and weight of the batteries necessary to run the traps. Consequently, current surveys and surveillance techniques use incandescent white light CDC traps that require 6 volts, four D-cell batteries. The lifespan of these batteries is approximately 4 trap nights. Therefore eight D-cell batteries or 3.2 pounds of batteries are needed per trap per week.

UV light increases the number of target insects collected in the traps, but UV traps require special 8 pound, 6-volt batteries. The usage duration of these larger batteries is approximately two days before recharging is necessary which requires a power supply be present near the field sites. The LED replacement bulb uses 6.7 and 2.6 times less energy than fluorescent and incandescent bulbs respectively. The reduced power consumption prolongs battery life, decreasing weight and increasing cost effectiveness. Further, the LEDs can be exchanged or added rapidly in the field to change the emitted wavelength (color) and illumination intensity. An additional advantage is that the solid state LEDs are nearly indestructible compared to incandescent bulbs and fluorescent tubes; thus, traps equipped with the disclosed lighting systems are both more rugged and energy efficient.

D. Targeted Arthropods

Arthropods of interest in this invention include flying insects and terrestrial arthropods that are vectors of disease, such as mosquitoes, including *Ochlerotatus sierrensis*, vector of heartworm to cats and dogs, *Culex* spp., *Anopheles* spp., and *Aedes* spp., midges, sand flies, black flies, filth flies, tsetse flies, ticks, mites, spiders, lice, bed bugs, kissing bugs, and fleas, as well as, agricultural pests such as lepidopteran species, beetles, and various hemipterans. Diseases, which are either known or suspected to be transmitted by these arthropods, include, but are not limited to, malaria, dengue, filariasis, leishmaniasis, lyme disease, trypanosomiasis, chagas disease, and various encephalitis viruses.

1. Insect Vision

New research into insect vision, physiology, and behavior has allowed for an increased understanding of positive phototaxis. Insect eyes are based on three photo-pigments, similar to human eyes, but insects see ultraviolet, blue, and green lights. Therefore, lights that are visible to humans, such as red light, are not visible to insects. Nocturnal insect eyes are ten times more efficient at capturing photos of light than diurnal insects. The wavelength of light that causes maximum stimulation of the photo-pigments, ($\lambda$max) corresponds to the brightest light an insect can visualize. The closer a wavelength light is to the $\lambda$max, the brighter the light is to the insect. It is preferred that the selected wavelength(s) of light corresponds to the maximum absorption ($\lambda$max) of one or more of the target arthropod species' three visual pigments. Examples of insect spectral sensitivities are provided in FIGS. 1-4, Table 1, and generally discussed throughout the text of Briscoe and Chittka, "The Evolution of Color Vision in Insects", Ann. Rev. Entomol. 46: 471-510 (2001), incorporated herein by reference. The wavelength spectra of maximum absorption of interest to the target arthropod species is comprised of photo pigments of wavelengths values in the ranges between about 320-400 nm for UV pigments, about 400-500 nm for blue, and about 500-600 nm for green depending on the arthropod species.

2. Attractants

Insects are inherently attracted to bright lights. Positive phototaxic behavior is usually associated with the search for alimentary resources or potential mates. Sugar resources and blood meals are important for the insect's survival and reproductive needs. These resources have distinct photo spectra such as flowers, honeydew, and fruits.

Blood meals may come from mammals, lizards, and birds, which in addition to having a color, produce infrared light or heat. Potential mates for insects can be distinctive patterns on the insect or external cues such as mating leks or swarming cues. The individual insects are attracted to these areas where they compete for copulations. By mimicking the visual cues of resources and mating areas, insects will be drawn to the traps in greater number.

DEFINITIONS

Unless defined otherwise, all technical and scientific terms used herein have the same meaning as is commonly understood by one of skill in the art to which this invention belongs at the time of filing.

Herein, "LED" refers to light emitting diode technology, the term is inclusive of both bulbs and chips of solid state design.

A "Zener" or "Zener diode" is a type of diode that permits current to flow in the forward direction like a normal diode, but not in the reverse direction.

In this invention, "lighting platform" refers to an arrangement of one or more LEDs, which will illuminate an area with a desired color and intensity of ultraviolet, visible and/or infrared light, and an electrical circuit. Preferably, a lighting platform comprises a plurality of LEDs that may emit similar or different wavelengths of light.

Unless otherwise specified, "insect" is used generically to refer to both insects and other arthropods (spiders, mites, centipedes, etc.) and is not limited strictly to hexapods.

"Polygonal embedded circuit board" is a preferred configuration for a supporting member of a lighting platform that can have a variable number of sides depending on the number of LED bulbs or chips used on the lighting platform.

The "viewing angle" ("viewing window", "solid angle", and similar terms) relates to the shape and size of the light being emitted by a single LED. The larger the angle the more diffuse the light. In general, the viewing angle is a conical shape of light projected from a LED.

A "cylindrical supporting member" refers to a cylindrical structure that rigidly holds the LEDs at fixed distances apart and at specific angles. Such structures are generally made from plastic, metal, fiberglass, or any combination thereof, but it may be comprised of other suitable materials.

A "lek" is a gathering of males, of certain animal species, for the purposes of competitive mating display.

A "standoff" is used in mechanics and electronics to separate two parts from one another. Standoffs can be many shapes and sizes and made of many different materials. Insulating standoffs may keep two parts interacting, thereby preventing an electronic short.

An "electrical network" is an interconnection of electrical elements such as resistors, inductors, capacitors, transmission lines, voltage sources, current sources, and switches. An "electrical circuit" is a network that has a closed loop, giving a return path for the current. An electrical circuit includes a positive terminal and a negative terminal.

"Zone of attraction" refers to the three dimensional area into which light is emitted by a trap. This area may be irregularly or regularly shaped and vary in cubic size. Light emitted into this area may be attractive to certain arthropods and unattractive, or even repellant, to other species of arthropods. As such, "zone of attraction" is inclusive of areas of repellence unless otherwise specified.

"Capture trap" or "trap" is inclusive of all traps used to collect arthropods, whether the arthropods are collected alive or killed by the trap (e.g. a bug zapper).

"Variable angle" means the viewing window or the angle at which light comes out of an LED bulb. This viewing window can vary from as small as a half to a quarter of a degree and produces a very narrow beam of light, such as is commonly used in laser pointers. In contrast, an LED chip has a 180 degree angle of emission (also known as solid angle). The more diffuse the angle the more dissipated the power of the LED. Thus, an LED chip generally has a more diffuse angle of emission than a comparable LED bulb with an angle of emission that is less than 180 degrees.

EXAMPLES

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

Basic Lighting Systems

A lighting system was made to replace existing incandescent bulbs in Center for Disease Control (CDC) light traps for disease and insect surveillance. The system was made using from four Toyoda-Gosei UV LEDs wired in parallel with 30 ohm resistors to regulate the current in an electrical circuit and attached to a supporting member, UV resistant tubing.

The LEDs face the four cardinal points and are held in place by UV resistant tubing. The tubing allows the four LEDs to be removed and replaced as a whole by changing the entire unit or lighting platform. The tubing and individual resistors allows for additional wavelengths or LEDs to simply be added to the existing tubing or alternative units can be used. Additionally, the LEDs are protected by an added 6 volt Zener diode placed within the electrical circuit and a 200 mA fuse to protect the other electronics in the trap.

Example 2

Maximizing Brightness to Attract Terrestrial Pests to an Irregularly Shaped Area Grain beetles have a photopigment with maximum stimulation between 350-370 nm. A decagonal lighting system is designed that contains five 350 nm LEDs with a viewing angle of 60 degrees and five 370 nm LEDs with a viewing angle of 30 degrees. The LEDs are alternated within the ten slots, one on each side of the polygon. The 350 nm light, therefore, illuminates a conical area completely surrounding the trap but only projects a few meters (<20 m) while the narrower angled 370 nm bulbs project a greater distance (at least 50 m) to attract beetles. The combination of lights, frequencies, and angles maximizes the capture area, attraction of the beetles of interest, and the brightness of the trap. The terrestrial beetles that inhabit grain silos will be attracted to the lights and be removed from the grain preventing spoilage and insect damage.

Optionally, additional lighting platforms may be added to the lighting system to increase light intensity. Such additional lighting platforms may be desired to compensate for ambient lighting conditions. For traps that are powered by non-portable power supplies or batteries, the increased power consumption by additional lighting platforms is unlikely to be a constraint on use. But, the increased power consumption, or weight by additional batteries, may be considered for traps with portable power supplies.

Example 3

A Cylindrical Replacement Lighting System

Sand flies are known to be attracted to flowers for sugar meals. Four ultraviolet 370 nm LEDs with a 90 degree viewing angle can be combined with six blue/green 500 nm LEDs with viewing angles of 60 degrees. This pattern simulates flowers on plants and is much brighter than natural flowers to the insect's photo-pigments, and therefore, appears as a giant flower.

Using a cylindrical supporting member to support a lighting platform yields a structure that is similar in shape to a conventional incandescent or fluorescent tube light. The cylindrical nature of the lighting system allows it to fit within the incandescent light mount on CDC-light traps or similar conventional traps and replace the incandescent or fluorescent light. The lighting system essentially acts as a replacement bulb and is inserted into the trap in a similar manner.

All of the compositions and methods disclosed and claimed herein can be made and executed without undue experimentation in light of the present disclosure. Those skilled in the art will appreciate that variations from the specific embodiments disclosed above are contemplated by the invention. The invention should not be restricted to the above embodiments, but should be measured by the following claims.

REFERENCES

The following references, to the extent that they provide exemplary procedural or other details supplementary to those set forth herein, are specifically incorporated herein by reference.

U.S. Pat. No. 7,191,560
U.S. Pat. No. 7,281,350
U.S. Pat. No. 7,181,885
U.S. Pat. No. 6,662,489
U.S. Pat. No. 7,073,287
U.S. Pat. No. 6,965,205
U.S. Pat. No. 6,840,003
U.S. Pat. No. 6,199,316
U.S. Patent Appl. Pub. No. 2007/0068068
U.S. Patent Appl. Pub. No. 2007/0056208
Briscoe and Chittka, "The Evolution of Color Vision in Insects", Ann. Rev. Entomol. 46: 471-510 (2001)

What is claimed is:

1. A lighting system for a capture trap comprising
   a) at least one replaceable lighting platform having an electrical circuit comprising a Zener diode, a resistor, and one or more light emitting diodes (LEDs), wherein the resistor regulates the voltage to the LED; and
   b) at least one supporting member that holds the LED at a variable angle in a substantially rigid position wherein the LEDs emit different wavelengths of light to attract different species of targeted anthropods.

2. The lighting system of claim 1 further comprising a second resistor between a positive terminal and the Zener diode, wherein the second resistor regulates the current to the Zener diode.

3. The lighting system of claim 1 further comprising two or more LEDs, wherein the brightness of the LEDs can be adjusted independently.

4. The lighting system of claim 1, wherein the supporting member is cylindrical or polygonal.

5. The lighting system of claim 1, wherein the supporting member is a polygonal circuit board having at least one variable angle LED located on one or more sides of the polygonal circuit board.

6. The lighting system of claim 5 further comprising a standoff.

7. A method of using a lighting system for a capture trap comprising
   a) inserting into a capture trap a lighting system, wherein the lighting system comprises at least one replaceable lighting platform having an electrical circuit comprising a Zener diode, a resistor, and one or more light emitting diode (LEDs), wherein the resistor regulates the voltage to the LED, and a supporting member that holds the LED at a variable angle in a substantially rigid position; and
   b) adjusting the lighting system to emit the desired wavelength(s) of light to attract one or more species of targeted arthropod.

8. The method of claim 7 wherein the lighting system further comprises a second resistor between a positive terminal and the Zener diode, wherein the second resistor regulates the current to the Zener diode.

9. The method of claim 7 wherein the lighting system comprises two or more LEDs, wherein the brightness of the LEDs can be adjusted independently.

10. The method of claim 9, wherein the LEDs emit different wavelengths of light.

11. The method of claim 7, wherein the supporting member is cylindrical or polygonal.

12. The method of claim 7, wherein the supporting member is a polygonal circuit board having at least one LED located on one or more sides of the polygonal circuit board.

13. The method of claim 12, wherein the lighting system further comprises a standoff.

14. A kit for adjusting the attractiveness of a capture trap comprising
   a) at least one replaceable lighting platform having an electrical circuit comprising a Zener diode, a resistor, and one or more light emitting diode (LEDs), wherein the resistor regulates the voltage to the LED; and
   b) at least one supporting member that holds the LED at a variable angle in a substantially rigid position wherein the LEDs emit different wavelengths of light to attract different species of targeted anthropods.

15. The kit of claim 14 further comprising a second resistor between a positive terminal and the Zener diode, wherein the second resistor regulates the current to the Zener diode.

16. The kit of claim 14 further comprising two or more LEDs, wherein the brightness of the LEDs can be adjusted independently.

17. The kit of claim 14, wherein the supporting member is cylindrical or polygonal.

18. The kit of claim 14, wherein the supporting member is a polygonal circuit board having at least one LED located on one or more sides of the polygonal circuit board.

19. The kit of claim 18 further comprising a standoff.

20. A method of adjusting the attractiveness of a capture trap comprising
   a) inserting into a capture trap a lighting system comprising at least one replaceable lighting platform having an electrical circuit comprising a Zener diode, a resistor, and one or more light emitting diode (LEDs), wherein the resistor regulates the voltage to the LED; and a supporting member that holds the LED at a variable angle in a substantially rigid position; and
   b) adjusting the lighting system to emit the desired wavelength(s) of light to attract one or more species of targeted arthropod.

21. The method of claim 20 wherein the lighting system further comprises a second resistor between a positive terminal and the Zener diode, wherein the second resistor regulates the current to the Zener diode.

22. The method of claim 20 wherein the lighting system comprises two or more LEDs, wherein the brightness of the LEDs can be adjusted independently.

23. The method of claim 22, wherein the LEDs emit different wavelengths of light.

24. The method of claim 20, wherein the supporting member is cylindrical or polygonal.

25. The method of claim 20, wherein the supporting member is a polygonal circuit board having at least one LED located on one or more sides of the polygonal circuit board.

26. The method of claim 25, wherein the lighting system further comprises a standoff.

* * * * *